United States Patent [19]

Assa

[11] Patent Number: 5,703,418

[45] Date of Patent: Dec. 30, 1997

[54] DC COOLED LINEAR MOTOR

[75] Inventor: Shlomo Assa, Encinitas, Calif.

[73] Assignee: Northern Magnetics, Inc., Santa Clarita, Calif.

[21] Appl. No.: 621,811

[22] Filed: Mar. 22, 1996

[51] Int. Cl.$^6$ .............................. H02K 1/20; H02K 41/00
[52] U.S. Cl. ................................................ 310/12
[58] Field of Search ................................ 310/12, 13, 15

[56] References Cited

U.S. PATENT DOCUMENTS

| | | |
|---|---|---|
| 4,713,939 | 12/1987 | Keith ............................ 310/12 |
| 4,728,382 | 3/1988 | Raschbichler ..................... 310/12 |
| 4,749,921 | 6/1988 | Chitayat ......................... 310/12 |
| 4,906,878 | 3/1990 | Twaalfhoven et al. ............... 310/12 |
| 5,128,569 | 7/1992 | Gladish .......................... 310/12 |

FOREIGN PATENT DOCUMENTS

| | | | |
|---|---|---|---|
| 63-283460 | 11/1988 | Japan | .............................. 310/12 |
| 63-302755 | 12/1988 | Japan | .............................. 310/12 |

*Primary Examiner*—Clayton E. LaBalle
*Attorney, Agent, or Firm*—Merchant, Gould, Smith, Edell, Welter & Schmidt

[57] ABSTRACT

A DC linear motor is cooled by providing a cooling duct extending transversely through the base mounting a coil. The coil is moveable along a track which is parallel to an extended permanent magnet. The cooling air is directed transversely along the width of the base. The compressed air passes through the duct and exits ports which extend transversely relative to the duct and the track. The air is ejected into the air gap between the permanent magnet and the coil.

16 Claims, 2 Drawing Sheets

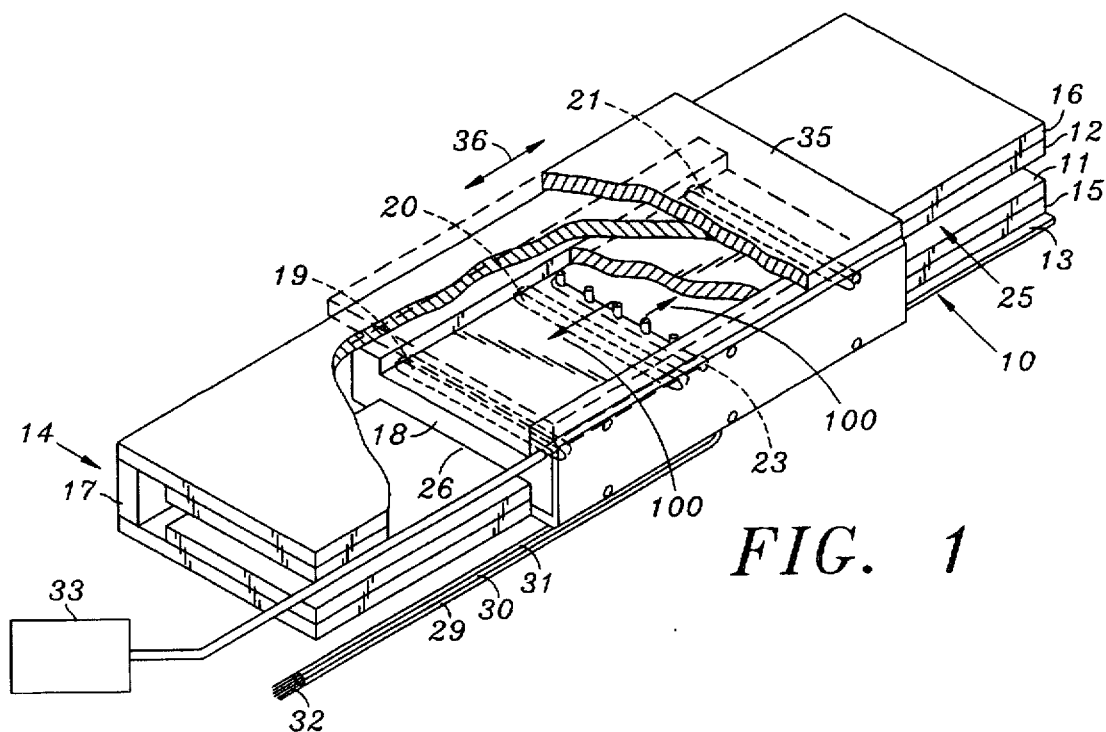
FIG. 1
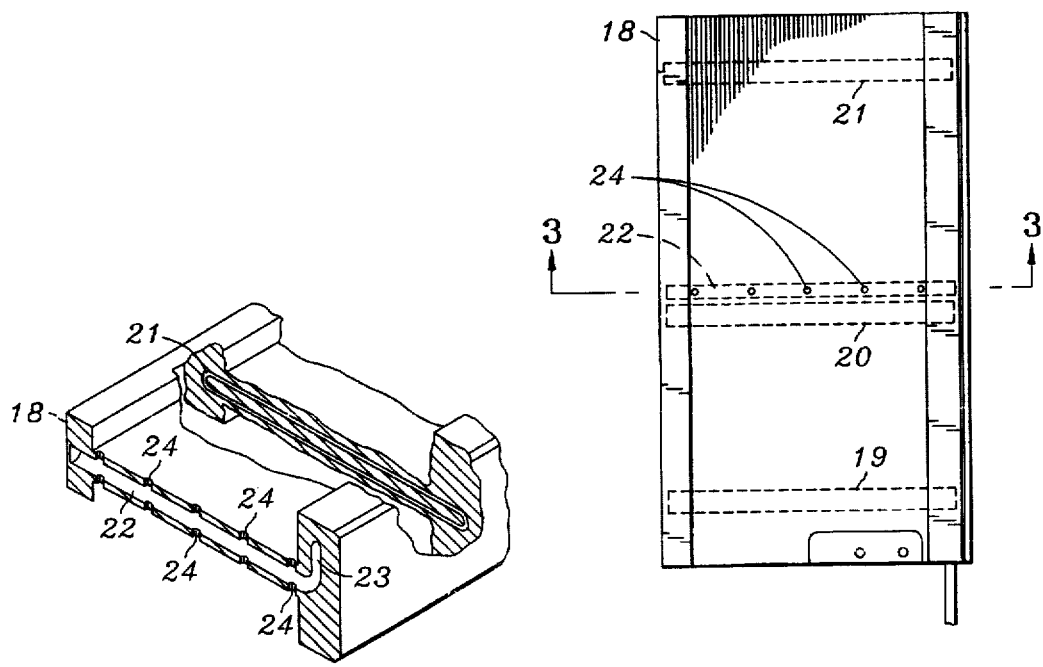
FIG. 3
FIG. 2

DC COOLED LINEAR MOTOR

BACKGROUND

Having a DC linear motor effectively operable under cooling conditions provides for higher performance motors.

This invention relates to a DC linear permanent magnet motor. In particular, the invention is concerned with providing effective cooling to such motors in a brushless form.

DC linear permanent magnet brushless motors provide a smooth direct drive linear thrust. An advantage of such a motor over rotary-to-linear drives, such as lead screws, are that there are no mechanical transmission devices. The motive force is generated by such a motor and transmitted directly through an air gap which extends between a permanent magnet and the coil. The motors are capable of high speeds and accurate positioning when used in a closed loop servo or feedback system.

A DC linear motor consists essentially of a moving secondary coil which is a multi-phase, preferably three phase, winding positioned in the air gap between a longer fixed U-shaped permanent magnet, namely the primary of the motor. A limitation of operation of the motor is that its efficiency is limited by the amount of current which is carried in the coils of the secondary winding, namely the moving winding between the U-shaped magnets. Without cooling of such a coil, the heat generated by the current in the windings limits the effective operation of the motor.

A need exists for providing effective cooling of the operative elements in such a DC linear motor thereby to provide for increased efficiency and/or for better operating characteristics.

SUMMARY

By this invention there is provided means for effecting cooling of operative components of a DC linear motor in a manner which minimizes the disadvantages of prior art motors.

According to the invention, there is provided a DC linear motor which includes a U-shaped permanent magnet. This forms the primary of the motor. A multi-phase wound coil, the secondary of the motor, is moveable along a track. The track extends between the arms of the magnet and along the length of the U-shaped magnets. There is a first air gap between one limb of the U of the permanent magnet the coil. A second air gap exists between a second limb of the U of the magnet and the coil.

A duct is provided in a base which mounts the coil. The duct extends transversely across a width of the base relative to the direction of the track. Cooling fluid can be directed into the duct over the width of the base.

Ports are provided from the duct for selectively directing cooling fluids into the first air gap and the second air gap such that the cooling fluid. The fluid can be selectively air under compressed pressure which is directed into the air gaps. The air in the air gaps is rendered turbulent since the base and coils move along the track in the air gaps between the limbs of the U. This turbulent air provides for effective and efficient cooling in the air gaps. Such cooling is transmitted to the base and wires molded into the base forming the coil of the secondary. This permits for higher currents to be carried by the secondary and/or for more efficient operation of the motor. The invention is further described with reference to the accompanying drawings.

DRAWINGS

FIG. 1 is a perspective view, with parts broken away, showing a DC permanent magnet brushless motor.

FIG. 2 is a top view of a base of the secondary showing the windings, and a transverse duct extending across the width of the base.

FIG. 3 is a cross sectional perspective view along line 3—3 of FIG. 2.

DESCRIPTION

Figure 5:
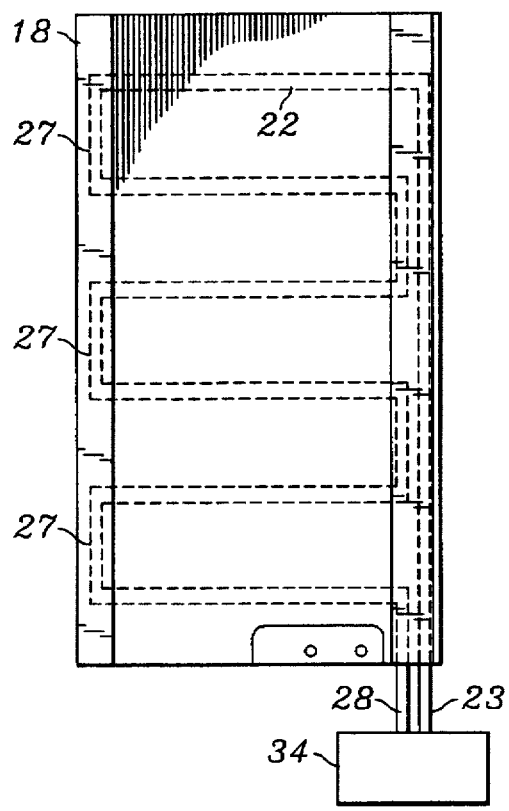
FIG. 5 is a diagrammatic top view of a base with an alternative cooling system.

A DC linear brushless motor 10 includes a pair of linear extending magnets 11 and 12, respectively, which constitute a primary of the motor. The magnets extend in a linear direction parallel to a linear track 13. The brushless motor does not use a brush and commutator; it uses a Hall Effect device to effectively control movement of a secondary of the motor 10 in relation to the magnets 11 and 12.

The magnets 11 and 12 are part of a U-shaped structure 14. There is a first arm 15 which mounts the first magnet 11 and a second arm 16 which mounts the second magnet 12. There is a cross arm 17 which extends between the arms 15 and 16.

A base 18 is provided for mounting a secondary which is composed of a coil having a phase windings 19, 20 and 21. These windings are wound in a multi-phase, preferably three phase, system on a base 18. The base 18 is made of a nonmagnetic material and is preferably molded. The windings 19, 20 and 21 of the coil are molded inside the base 18. The base material can be a Teflon™ or other plastic form. The base 18 in cross section has a relative I-beam shape.

A duct 22 is molded into the base 18. The duct 22 extends transversely across the width of the base 18. This width 18 is directed transversely to the longitudinal track 13. The duct 22 is also formed of a non-magnet material and can be of brass, Teflon™, aluminum or the like. The approximate diameter of the duct 22 would be about a quarter of an inch in diameter, namely about one-half of the depth of the base 18.

The duct 22 is connected to an inlet duct 23 at one side of the duct 22. At spaced intervals of approximately 0.4 of an inch there are ports 24 which extend transversely to the duct and also transversely to the track direction 13. Air can be directed upwardly into an air gap 25 between the magnet 12 and the base 18 housing the windings 19, 20, and 21 and downwardly into an air gap 26 between the magnet 11 and the base 18 with windings 19, 20, and 21. The air gap can be a few thousands of an inch wide.

There are about six ports 24 spaced transversely across the width of the base 18. The ports 24 are formed by drilling through the base material 18 and the duct 22 so that a fluid connection is made between the internal bore of the duct 22 and the ports 24.

Each of the windings 19, 20 and 21 are connected through a wiring harness 29, 30 and 31 to a cable 32 which connects the system to a power supply to power up the secondary of the motor.

In the embodiment of FIG. 1 and FIGS. 2 and 3, the inlet for the cooling fluid can be connected with a compressed air source 33. Any other kind of cooling gas can be provided as is appropriate under the circumstances.

Figure 4:
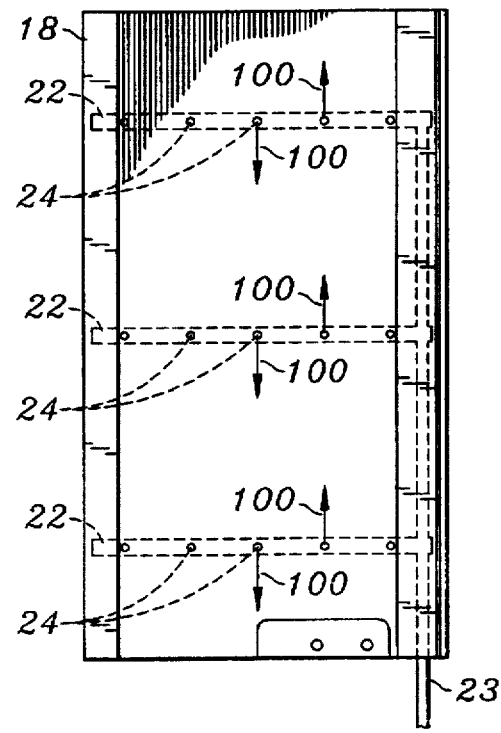
FIG. 4 is a diagrammatic top view of a base with an alternative cooling system.

The air as indicated in FIGS. 1 and 4 escapes through the outlets of ports 24 to form a turbulent or laminar type air flow in the air gaps 25 and 26 and are the surface of base 18. In this manner the windings 19, 20 and 21 in the base 18 are cooled in an effective way across the width of the base 18. The cooling air is directed as indicated by arrows 100. This cools the base 18 which in turn cools the coils in the base 18.

Above the base 18 there is mounted a table 35 which moves forwardly and backwardly as indicated by arrow 36 according to the operation of the linear motor 10. The table 35 can be used to mount any work piece as is required to be operated by the linear motor.

The arrangement of the invention will provide for a motor which can operate with higher currents and/or better effective efficiency due to the effective cooling provided to the coils of the secondary by effectively transmitting cooling fluid into the air gaps 25 and 26 by the turbulent air ejected from the ports 24 connected to the ducts 22.

Many other forms of the invention exist each differing from the other in matters of detail only.

For instance, although the invention has been described with reference to a DC linear motor of the brushless kind, it is possible for the cooling to be effectively carried out on motors of a non-brushless structure.

In some other cases, the ports 24 may extend only into air gap 25 and in other cases into a gap 26 only. In yet further variations, a different number of ports 24 can be provided. Likewise, in other embodiments, a different number of ducts 22 can be provided. This variation is shown in FIG. 4.

In FIG. 5 there is provided yet a different variation wherein the ducts 22 are connected by cross ducts 27 so as to form a closed loop system between the inlet 23 and outlet 28 through which the cooling fluid can pass through the base 18. In this embodiment of FIG. 5, there are no outlet ports 24 from the ducts 22.

In the embodiment of FIG. 5, a cooling fluid in the form of water or other cooling or refrigerant material may be provided to the inlet 23 and recycled through the ducts 22 and 27 and then exit through outlet 28. The cooling fluid source and return 34 may be a suitable compressor and evaporator system.

In other forms there is no air ejected into the air gaps 25 and 26 to effect cooling. In these forms of the invention where there is no ejection of cooling gas into the air gap, the effective flow of the cooling fluid transversely through the base 18 provides for effective cooling of the coils. Where the cooling fluid is recycled to a cooling system enhanced cooling is further attained.

In yet further form, the duct 22 may not have exit ports 24. The outlet of the duct 22 is the side of the base 18 remote from the inlet so that cooling gas is ejected towards the cross arm 17 of the U magnet. It is then deflected backwards over the base 18 containing the windings forming the secondary end through the air gaps 25 and 26 between the windings and the arms 15 and In other situations, there is a system of a single sided motor, namely with a single magnet arm and a coil reacting with that arm. Air is directed to only one side from the base 18.

The invention is to be determined solely in terms of the following claims.

I claim:

1. A DC linear motor, comprising:
   a primary extending in a linear direction,
   a current receiving coil mounted on a base for linear movement on a track extending in the linear direction, an air gap defined between the coil and the primary, a base including means for receiving a cooling fluid, and
   a duct for directing the cooling fluid through the base to effect cooling,
   the primary being a permanent magnet having two arms, and the coil extends between the arms, such that an air gap is defined between each arm and the coil, and wherein cooling is effected in each air gaps, and
   wherein the duct include multiple spaced ports exiting from the duct thereby to eject cooling fluid into the air gap.

2. A motor as claimed in claim 1 wherein the base defines a width, and the duct including several ports, the ports being spaced from each other and being directed to project cooling air at spaced intervals along a width of the base.

3. A motor as claimed in claim 2 wherein the ports are directed transversely relative to the duct and the track.

4. A motor as claimed in claim 2 wherein the base is formed as a molded component, and wherein the duct is molded into place in the base, and the coil is molded into the base.

5. A motor as claimed in claim 2 wherein the cooling fluid compressed air.

6. A motor as claimed in claim 2 wherein the duct forms a closed path wherein cooling fluid cycled through the path between an inlet to the duct and an outlet from the duct.

7. A motor as claimed in claim 2 wherein the cooling fluid is selectively a liquid or a gas.

8. A motor as claimed in claim 2 wherein the coil includes multi-phase winding and including means for directing a current through the coil, the base being connected with a table, and wherein the coil, base and table are moveable together along the track.

9. A motor as claimed in claim 2 wherein the duct extends transversely relative to the track, and the duct extending substantially across a width of the base such that a cooling fluid is directed substantially across the width of the coil.

10. A DC linear motor, comprising:
    a primary extending in a linear direction,
    a current receiving coil mounted on a base for linear movement on a track extending in the linear direction, an air gap defined between the coil and the primary, a base including means for receiving a cooling fluid, and
    a duct for directing the cooling fluid through the base to effect cooling,
    the primary being a permanent magnet having two arms, and the coil extends between the arms such that an air gap is defined between each arm and the coil, and wherein cooling is effected in each air gaps, and
    there being several ducts in the base, the ducts being relatively spaced from each other, and the ducts being directed transversely relative to the track, the ducts having multiple spaced ports.

11. A motor as claimed in claim 10 including several ports, the ports being spaced from each other and being directed to project cooling air at spaced intervals along a width of the base.

12. A motor as claimed in claim 11 wherein the ports are directed transversely relative to the duct and the track.

13. A DC linear brushless motor comprising:
    a U-shaped permanent magnet extending in a linear direction,
    a coil having a multi-phased current receiving windings mounted in a base for linear movement in a track extending in the linear direction,
    a first air gap between one arm of the U-shaped magnet and the coil, and a second air gap between the second arm of the U-shaped magnet and the coil,
    a duct extending across a width of a base mounting the coil, and ports directed from the duct into both of the first air gap and the second air gap, and an inlet to the duct for a cooling gas such that the gas entering the duct exits from the ports into the air gaps between the base and the magnet.

14. A motor as claimed in claim 13 wherein the duct is formed of a non-magnetic material molded into a base, the base being formed of a non-magnetic material.

15. A motor as claimed in claim 13 wherein the base defines a width, and the duct includes several ports, the ports being spaced from each other and being directed to project cooling air at spaced intervals along the width of the base.

16. A DC linear brushless motor comprising:

a U-shaped permanent magnet extending in a linear direction, multi-phased current receiving windings of a coil mounted in a base for linear movement in a track extending in the linear direction, the base defining a width, and the duct including several ports, the ports being spaced from each other and being directed to project cooling air at spaced intervals along the width of the base, a first air gap between one arm of the U-shaped magnet and the coil, and a second air gap between the second arm of the U-shaped magnet and the coil, the ducts extending across a width of a base mounting the coils, the ducts being formed of a non-magnetic material molded into the base, the base being formed of a non-magnetic material, and an inlet to the ducts for a cooling gas such that gas entering the duct and an exit for the gas from the ducts.

* * * * *

UNITED STATES PATENT AND TRADEMARK OFFICE
CERTIFICATE OF CORRECTION

PATENT NO. : 5,703,418

DATED : December 30, 1997

INVENTOR(S) : Shlomo Assa

It is certified that error appears in the above-identified patent and that said Letters Patent is hereby corrected as shown below:

At column 1, line 53, please delete ". The fluid" after the first occurrence of the word "fluid".

At column 2, line 4, "cross sectional" should read —cross-sectional—.

At column 2, line 29, "nonmagnetic" should read —non-magnetic—.

At column 3, line 51, please insert —16.— after "and".

Signed and Sealed this

Fifteenth Day of December, 1998

*Attest:*

BRUCE LEHMAN

*Attesting Officer*     *Commissioner of Patents and Trademarks*